United States Patent
Schmalzried

(10) Patent No.: US 7,516,780 B2
(45) Date of Patent: Apr. 14, 2009

(54) DEVICE FOR EXCHANGING HEAT AND METHOD OF MANUFACTURING SUCH DEVICE

(75) Inventor: Günther Schmalzried, Korb (DE)

(73) Assignee: Behr Industrietechnik GmbH & Co. KG, Stuttgart (DE)

( * ) Notice: Subject to any disclaimer, the term of this patent is extended or adjusted under 35 U.S.C. 154(b) by 690 days.

(21) Appl. No.: 10/961,416

(22) Filed: Oct. 8, 2004

(65) Prior Publication Data

US 2005/0077033 A1    Apr. 14, 2005

(30) Foreign Application Priority Data

Oct. 9, 2003    (DE) ................ 103 47 068

(51) Int. Cl.
*F28F 1/32*    (2006.01)

(52) U.S. Cl. ............... 165/152; 165/DIG. 505

(58) Field of Classification Search ............ 165/152
See application file for complete search history.

(56) References Cited

U.S. PATENT DOCUMENTS

| | | | | |
|---|---|---|---|---|
| 1,401,918 A * | 12/1921 | Neveu | ......... | 165/152 |
| 1,421,546 A * | 7/1922 | Parkin | ......... | 165/152 |
| 1,950,500 A * | 3/1934 | Loprich et al. | ......... | 165/152 |
| 4,778,004 A * | 10/1988 | Paulman et al. | ......... | 165/150 |
| 5,865,243 A * | 2/1999 | Kato et al. | ......... | 165/153 |
| 6,688,380 B2 * | 2/2004 | Lavochkin et al. | ......... | 165/150 |
| 7,111,670 B2 * | 9/2006 | Yoshioka et al. | ......... | 165/152 |
| 2003/0029608 A1 * | 2/2003 | Shimoya | ......... | 165/152 |

\* cited by examiner

*Primary Examiner*—Allen J Flanigan
(74) *Attorney, Agent, or Firm*—Greer, Burns & Crain, Ltd.

(57) ABSTRACT

The device for exchanging heat according to the invention includes a flow-through device through which a fluid can flow and a fin-like shaped part around which air can flow and which is joined to the one or more flow-through devices wherein the joint allows exchange of heat to occur between the air and the fluid. According to the invention, the joint includes a plurality of recesses positioned along a longitudinal direction of the one or more fin-like shaped parts.

16 Claims, 5 Drawing Sheets

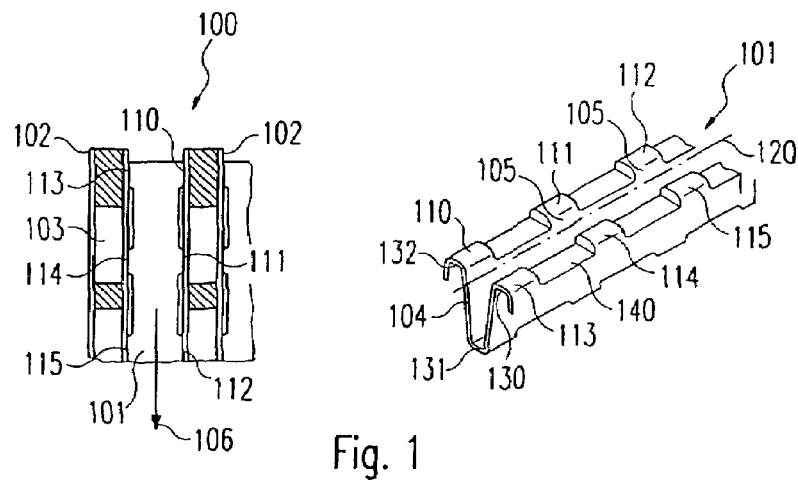
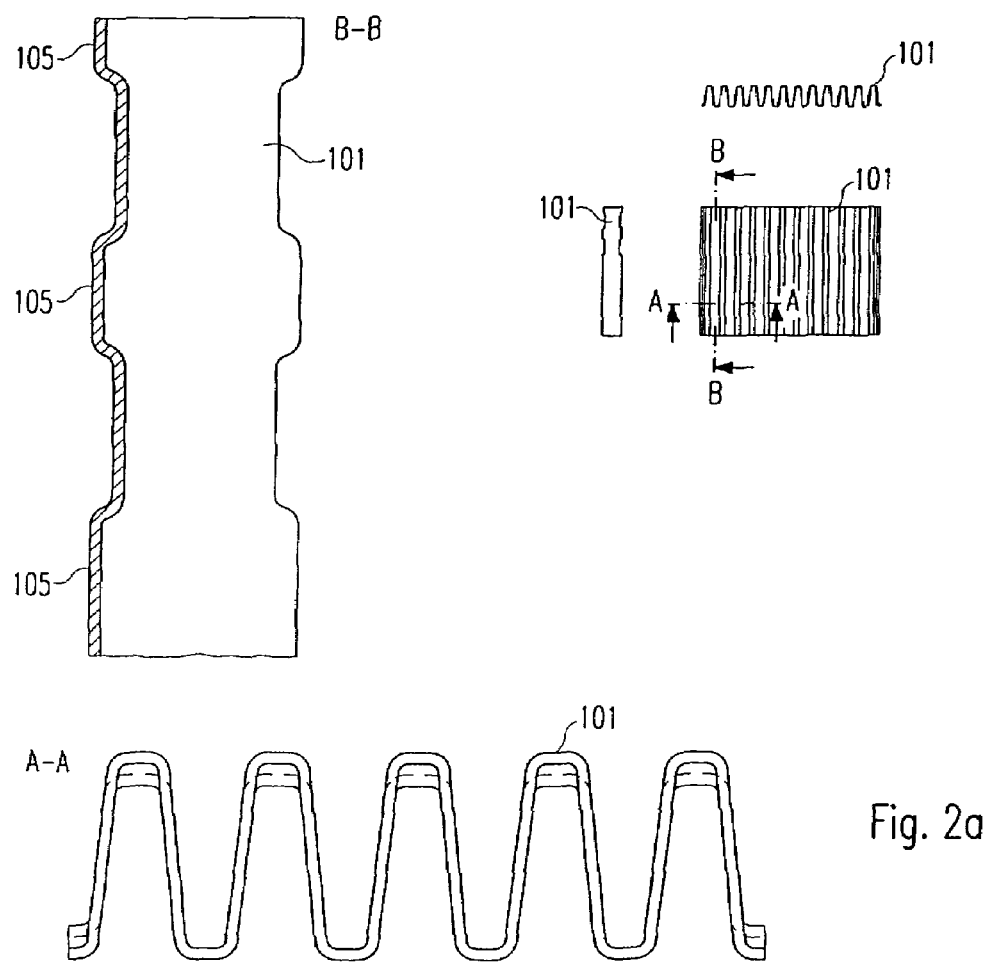
Fig. 1
Fig. 2a

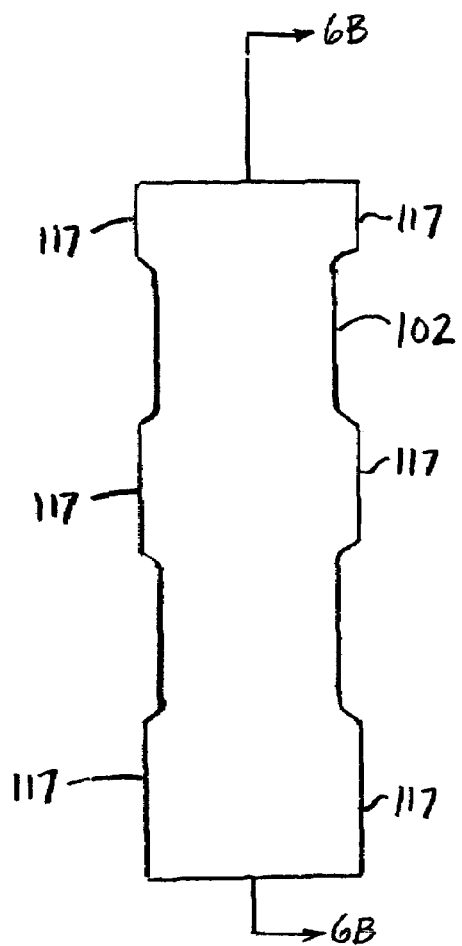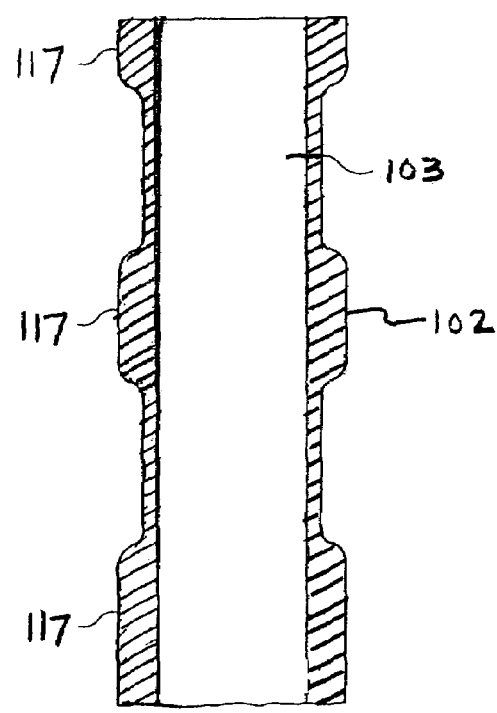
Fig. 6A
Fig. 6B

DEVICE FOR EXCHANGING HEAT AND METHOD OF MANUFACTURING SUCH DEVICE

BACKGROUND

The present invention relates to a device for exchanging heat between air flowing toward or around said device and a fluid flowing partially through said device, in particular to a charge-air cooler for internal combustion engines as they are used in particular in the field of motor vehicles.

Such heat exchangers are generally, and charge-air coolers specially known from the prior art.

Such a known charge-air cooler for a motor vehicle serves to cool down the temperature of charged air supplied from a turbocharger or a compressor to an internal combustion engine of a motor vehicle which can increase the power of the internal combustion engine.

FIG. 4 shows such a charge-air cooler 400, in this case a multiple-row type, for a motor vehicle as known in the prior art.

As FIG. 4 shows, the charge-air cooler 400 comprises a plurality of flat pipes 401 formed by extrusion molding of an aluminum alloy.

The pipes 401 are arranged in several parallel planes where said pipes 401 are also arranged parallel relative each other in each plane.

Each pipe 401 comprises a plurality of refrigerant paths (refrigerant ducts) running substantially parallel relative a longitudinal direction of the pipe 401 and being circular in cross-section and with refrigerant flowing through.

As FIG. 4 further shows, a plurality of corrugated aluminum fins (cooling fins) 402 which are formed by means of a roller and arranged between adjacent pipes 401.

FIG. 5 shows such a fin 402 in detail.

In cross-section, the prior art fin is wave-like or U-/W-like in shape. At the highest places 501, 502 and the lowest places 503 of the cross-section or the contact faces 504, 505, 506 formed by said highest and lowest places 501 to 503 and running in longitudinal direction of the fin 402, each fin 402 is solder-joined with a respective pipe 401.

Said pipes 401 and fins 402 form a core section 403 of the prior art charge-air cooler.

End plates 404 for reinforcing the core section 403 are arranged both at the top and the bottom end of the core section 403 according to FIG. 4 and soldered to the pipes 401 and the fins 402 by means of solder plated or coated, respectively, to both side faces of the fins 402.

A pair of header tanks 405 is joined to each flow duct end of the pipes 401 to be flow-tight and to extend in a direction perpendicular to the longitudinal axis of each pipe 401.

A flow-tight joining is to be understood such as to allow liquid and/or gaseous fluids such as the refrigerant, to flow through said joint which is fluid-tight and/or gastight.

The high temperature charge air at approximately 270° C. flows toward or around the core section 403 of the charge-air cooler wherein heat is exchanged between the charge air and the refrigerant so as to cool down the charge air.

In heat exchange, heat is removed, from the hot charge air via the fins 402 and via the pipes 401 joined to the fins 402 via the contact surfaces 504, 505, 506, to enter the refrigerant which thus heats up considerably.

It may occur precisely in first or front—relative the approach or approaching direction of the charge air at the core section 403—refrigerant ducts (critical profiles or block regions) where the approaching charge air is still highest in temperature, that this type of heat exchange may led to that the coolant flowing there, i.e. in said first coolant ducts, heats up beyond its boiling point.

Such exceeding the boiling point of the coolant results in bubbles appearing in the coolant and thus in problems of erosion and cavities.

This kind of problem with this charge-air cooler can also occur with charge-air coolers generally in the case of high-temperature approaching air.

It is therefore the object of the present invention to provide a heat exchanger which is improved, with respect to exceeding the boiling point and the ensuing problems, compared to the prior art described above.

SUMMARY

The device for exchanging heat according to the invention comprises, one or more flow-through devices through which a fluid can flow, and one or more fin-like shaped parts around which air can flow and which is/are joined to said one or more flow-through devices.

In this context a shaped part is understood to mean a modular unit having a specified shape. A fin-like shaped part is understood to mean a shaped part extending in one major direction i.e. a longitudinal direction or a direction along a longitudinal axis of the shaped part. A cross-section perpendicular to the longitudinal axis of the shaped part is U- or W-like in shape.

A joint is understood to mean a joint by which the joined parts are joined force-closed, form-fitting and/or material-fitting.

Fluids or fluid media within the scope of the invention are understood to mean liquid and/or gaseous media of any desired viscosity such as in particular but not exclusively, oils, liquids in particular having high heat of condensation, water, air or gases such as carbon dioxide, and refrigerants capable of evaporating or condensing. Said fluids or fluid media may contain additives such as corrosion inhibitors.

This joint of the invention allows exchange of heat to occur between the air and the fluid.

According to the invention, said joint comprises a plurality of recesses positioned along a longitudinal direction of the one or more fin-like shaped parts.

As can be seen in the illustration, the joint comprises a plurality of niches or recesses between the one or more flow-through devices and the one or more fin-like shaped parts (stepped air-fins).

Said niches along the joint between the one or more shaped parts and the one or more flow-through devices reduce the mating surface or contact surface between the shaped part and the flow-through device. Above this reduced mating surface heat is transferred to a lesser extent and/or at a slower speed.

The result of this is that according to the invention heat between the air and the fluid is transferred to a lesser extent and/or at a slower speed.

Consequently, with the hot air approaching the device of the invention, less heat or less thermal energy is transferred from the hot air to the fluid such as a coolant which thus heats up less.

This allows to prevent that the fluid boils or steam bubbles arise in boiling fluid and to prevent the subsequent problems as described above.

In this method of manufacturing a device for exchanging heat, a junction point is established between one or more flow-through devices through which a fluid can flow and one or more fin-like shaped parts around which air can flow and which is/are joined to said one or more flow-through devices, by soldering, welding or bonding, wherein said joint allows exchange of heat to occur between the air and the fluid.

The joint established according to the invention comprises a plurality of recesses positioned along a longitudinal direction of the one or more fin-like shaped parts.

The principle of the invention further offers the advantage that in manufacturing the device of the invention for example by soldering, required stresses, in particular stresses across the fin-like shaped part, are maintained. In other words, a supporting effect maintained through said stresses and necessary during manufacturing e.g. in soldering, will be maintained.

The invention also offers the advantage of reducing costs considerably.

The recesses or niches can be easiest realized by a plurality of ridges with the recesses arranged inbetween.

In a preferred embodiment the one or more fin-like shaped parts comprises along the joint said plurality of ridges by means of which a joint is established to the one or more flow-through devices wherein recesses are formed between the ridges.

Further, the one or more flow-through devices may comprise said plurality of ridges 117 along the joint by means of which a joint is established to the one or more fin-like shaped parts wherein recesses are formed between the ridges.

A ridge may be approximately 2 mm to 8 mm in length, in particular approximately 4 mm, and/or approximately 0.1 mm to 2 mm in height, in particular 1 mm.

The ridge can further be rounded at least at one end. In other words, edges of the ridge in an air flow path may be rounded.

In another preferred embodiment the shapes of the recesses and/or the number of recesses are configured dependent on air temperature.

In places where the temperature of the approaching air is particularly hot it is advantageous to provide larger and/or more recesses.

A recess may be approximately 5 mm to 15 mm in length, in particular approximately 9 mm, and/or approximately 0.1 mm to 2 mm in height, in particular 1 mm.

In another preferred embodiment a plurality of fin-like shaped parts are joined together to form a cooling element such that the cross-section of said cooling element is wave-like in profile.

The one or more fin-like shaped parts may be a cooling fin or a corrugated fin modified according to the invention, in particular a cooling fin having a thickness of approximately 0.05 mm to 1 mm, preferably approximately 0.5 mm, and/or a height of approximately 4 mm to 12 mm, preferably approximately 8.5 mm.

Further, the one or more fin-like shaped parts and/or the one or more flow-through devices can be made of a material selected from a group of materials including, aluminum, aluminum alloys, iron, iron alloys, bronze, copper, copper alloys and the like.

In another preferred embodiment the flow-through device comprises one or more interior flow ducts substantially parallel to the longitudinal axis of the flow-through device, preferably a plurality of interior flow ducts substantially parallel to the longitudinal axis.

The one or more flow ducts may have a cross-section shaped substantially as a circle or ellipsoid, a polygon or rectangle or mixed shapes, for example rectangular with more or less rounded corners.

The fluid or the fluid medium such as a coolant or a refrigerant, flows through said one or more flow ducts at least in sections, wherein said fluid may be under operating pressure.

Further there may be provided that the shape of said recess and/or the number of recesses is configured and selected in dependence of the position of a flow duct relative the surrounding air flow. This principle is based on the above considerations as to temperature.

In a preferred embodiment the air flows around the one or more fin-like shaped parts in the longitudinal direction of the one or more fin-like shaped parts.

It may also be provided that the one or more fin-like shaped parts is/are joined to two flow-through devices arranged in parallel wherein said one or more fin-like shaped parts is/are arranged between the two flow-through devices such that the longitudinal direction of the one or more fin-like shaped parts is/are arranged at an angle of approximately 90° relative the principal extension of the flow-through devices arranged in parallel.

For draining or conducting the fluid from and through the one or more flow-through devices, said device may be joined to a header and/or distributing device in particular to be gas- and/or fluid-tight.

In another preferred embodiment said header and/or distributing device is pipe-shaped in cross-section.

Another preferred embodiment is a cooler block in which a plurality of fin-like shaped parts according to the invention is used and a plurality of the flow-through devices of the invention wherein the plurality of flow-through devices are arranged in several parallel planes, in particular in two planes. Said fin-like shaped parts may be placed inbetween two adjacent flow-through devices each, in particular in series or in parallel.

Also, a shaped part extending through a plurality of planes may be provided.

Furthermore, a plurality of header and/or distributing devices may each be joined to a plurality of said flow-through devices in this cooler block.

It is preferred to realize the invention in a cooler, in particular a charge-air cooler where the air used is charged air, in particular charged air of a motor vehicle to be cooled down in the cooler, in particular in the charge-air cooler.

DESCRIPTION OF THE FIGURES

Other advantages and embodiments of the present invention can be taken from the accompanying drawings. These show in:

FIG. 1 a partial view of a device for exchanging heat of the invention;

FIG. 2*a* and FIG. 2*b* views of a corrugated or cooling fin according to the device for exchanging heat of the invention;

FIG. 6A a view of an embodiment of a flow-through device includinga plurality of ridges.

FIG. 6B a cross-sectional view taken substantially along line 6B-6B of FIG. 6A.

DETAILED DISCRIPTION

The charge-air cooler of the present invention having stepped air fins or corrugated/cooling fins, referred to as fins, will be described below.

Figure 2B:
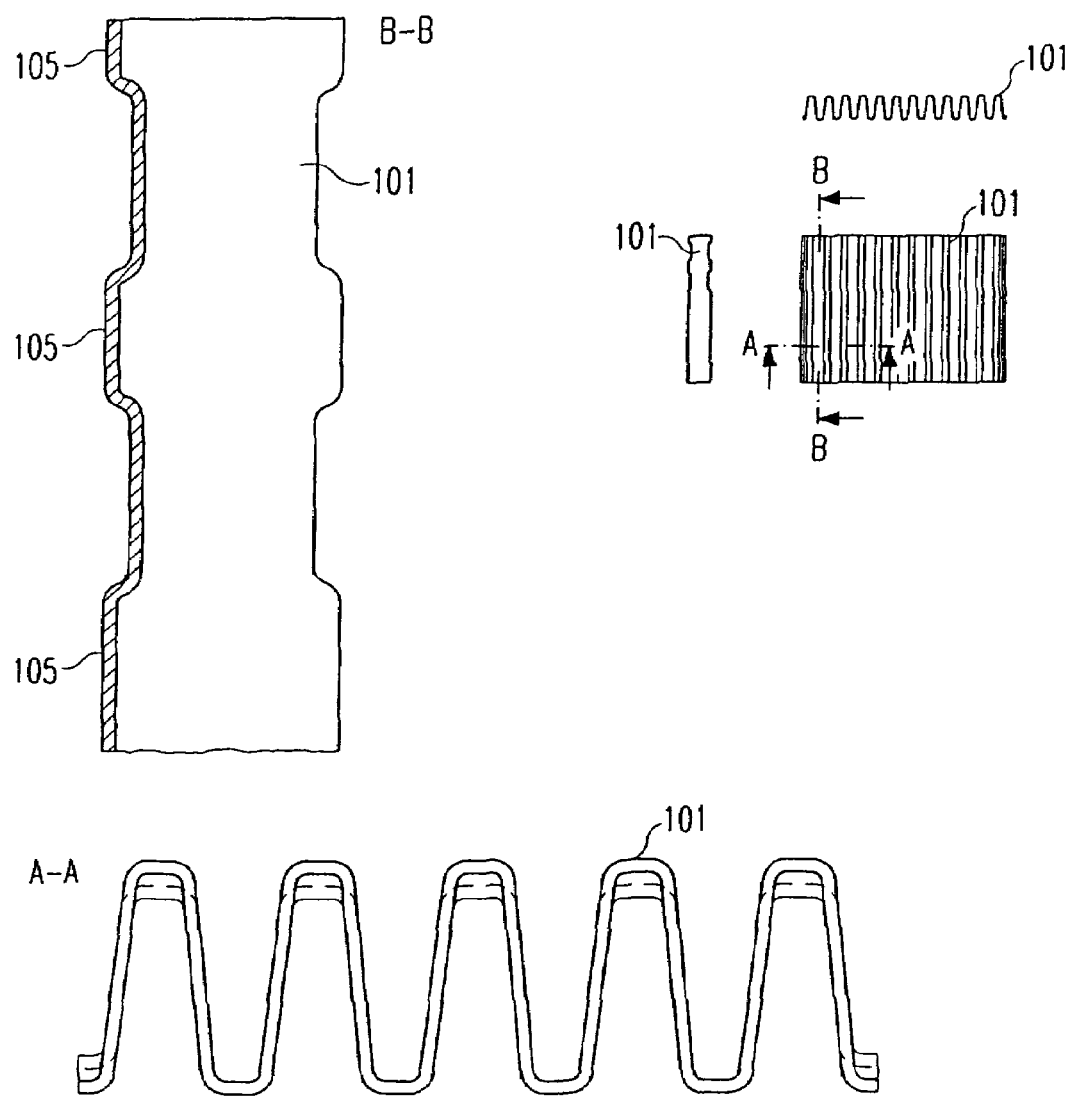

FIG. 1 and FIGS. 2*a* and 2*b* in particular show the stepped air fins 101 and their geometry and their joint to the flat pipe 102 of the invention through which a coolant flows. The dimensions in the illustrations in FIG. 2a, which correspond to those in FIG. 2b, are not intended to be limited thereto.

Figure 3:
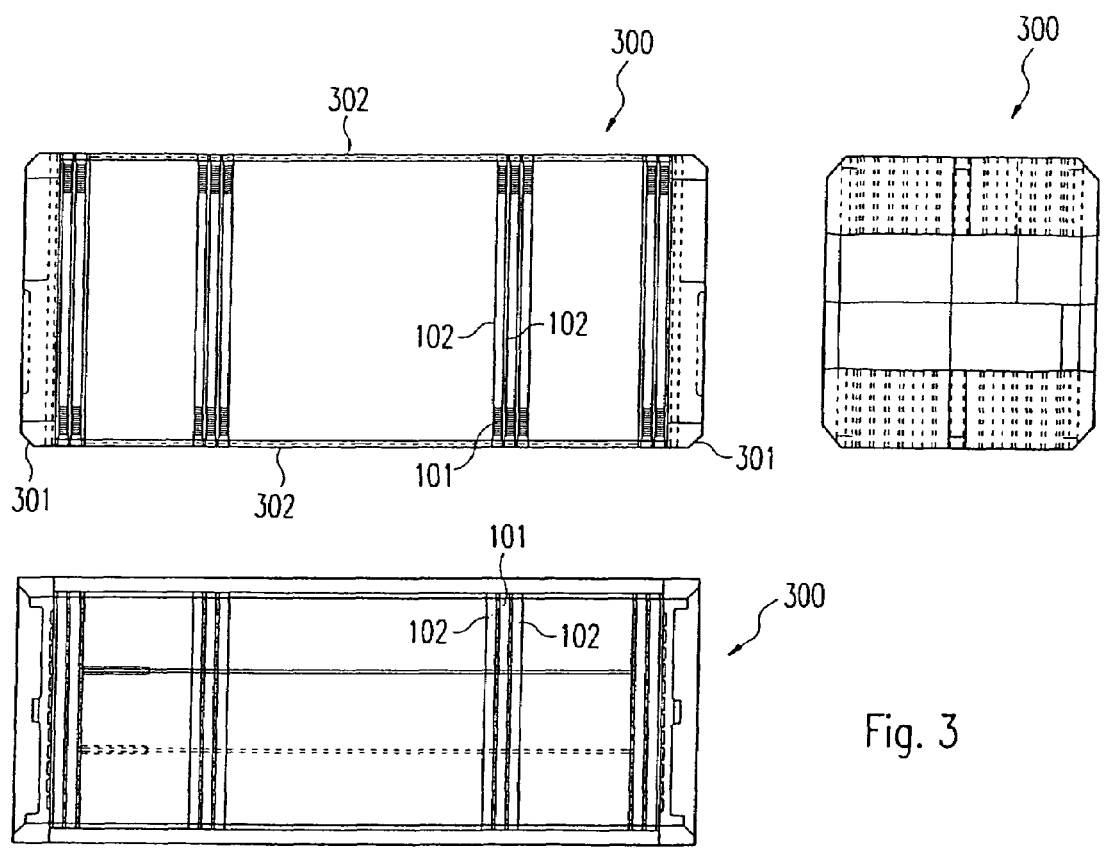
FIG. 3 views of a cooler block where a plurality of devices for exchanging heat according to the invention are arranged.
Figure 4:
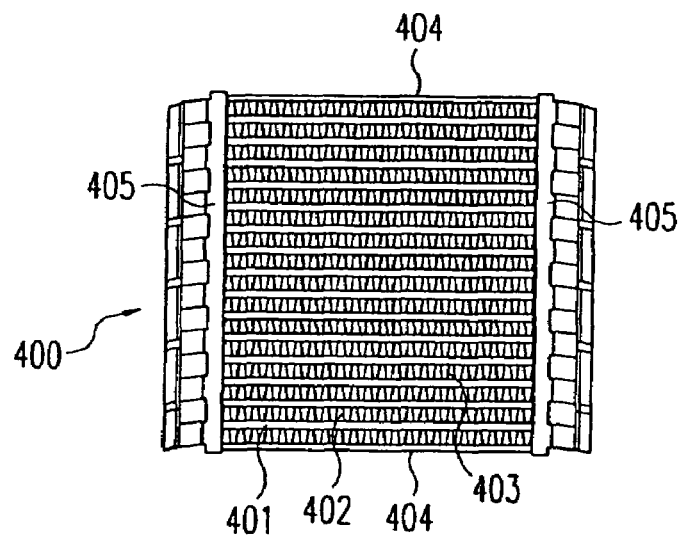
FIG. 4 a view of a cooler block of a prior art charge-air cooler.
Figure 5:
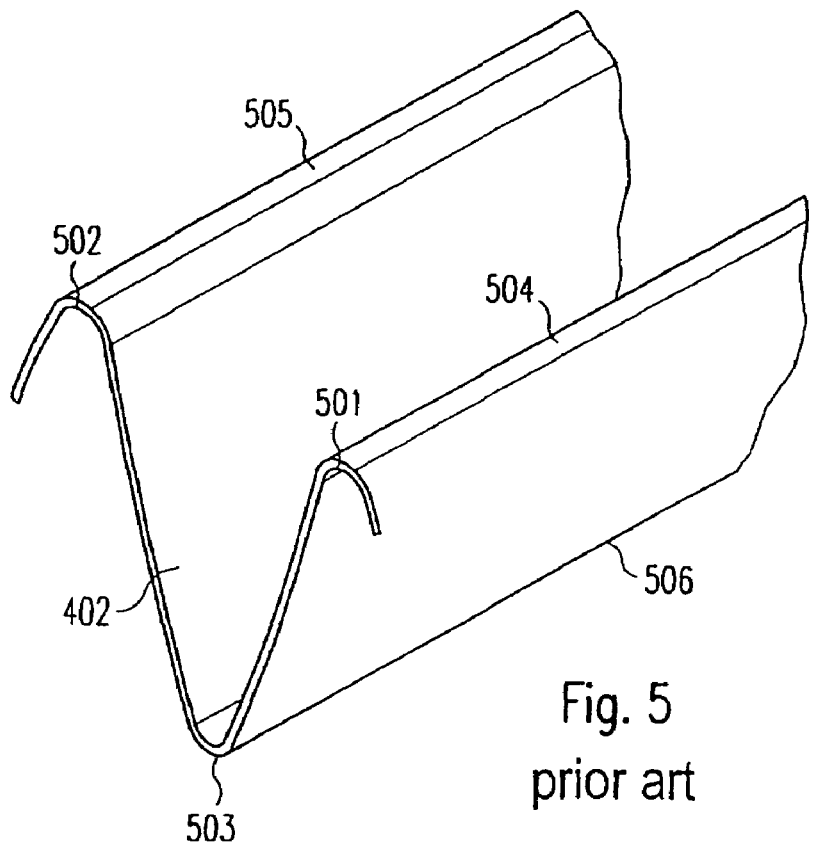
FIG. 5 a view of a prior art cooling fin.

FIG. 3 shows a cooler block comprising a cooler matrix 300 of the charge-air cooler of the embodiment, in this case a double-row charge-air cooler having a plurality of the stepped air fins 101 and flat pipes of the invention.

The dimensions in the illustration in FIG. 3 are intended to be exemplary but not limited thereto.

For example the dimensions of the cooler block of the embodiment in FIG. 3 are approximately 630 mm×222 mm×270 mm.

As FIG. 3 shows, the cooler matrix of the cooler block of the double-row charge-air cooler 300 comprises a plurality of flat pipes 102 formed of an aluminum alloy by extrusion molding.

The pipes 102 in the cooler matrix of the embodiment are arranged in two parallel planes where the flat pipes 102 in one plane are also arranged parallel relative each other in the plane.

Each pipe 102 comprises a plurality of refrigerant paths (refrigerant ducts) running substantially parallel relative a longitudinal direction of the pipe 102 and being rectangular in cross-section 103 and with refrigerant flowing through.

As FIG. 3 further shows, a plurality of corrugated and stepped aluminum fins (cooling fins) 101 of the invention are formed by means of a roller and arranged between adjacent pipes 102.

FIG. 1 and the FIGS. 2a (with exemplary dimensions) and b show such a stepped cooling fin 101 of the invention or the cooling-fin flat-pipe joint 100 of the invention in detail.

The illustrated cooling fin 101 of the invention is approximately 8.6 mm in height, approximately 1 mm in thickness and approximately 222 mm in length.

It is also possible to provide interrupted stepped fins 101 configured according to the invention being shorter in length.

In cross-section 104, the stepped fin 101 of the invention is wave-like or U-/W-like in shape.

Along a longitudinal axis 120 of the stepped fin 101, at geometrical turning points 130, 131, and 132 of the cross-section 104, the stepped fin 101 runs in a ridge-like path.

In the ridge-like path of the stepped fin 101, ridges 105 and recesses 140 are alternatively arranged.

The ridge 105 is approximately 4 mm in length and approximately 1 mm in height. Further, the edges of the ridge 105 being in an air flow path are rounded.

The recess 140 is approximately 9 mm in length and approximately 1 mm in height.

The ridges 105 are manufactured by processes where material is added or removed.

Surfaces of the ridges 105 form reduced contact or mating surfaces via which the stepped fin 101 is solder-joined to the flat pipe 102.

In this case there will be no surface contact between the stepped fin 101 and the flat pipe 102 in the recesses 140.

The flat pipes 101 and the stepped cooling fins 102 form a core section or at least part of the cooler matrix 300 of the charge-air cooler.

End plates 301 for reinforcing the core section are arranged both at the top and the bottom end of the core section according to FIG. 3 and soldered to the pipes 102 and the fins 101 by means of solder plated or coated, respectively, to both side faces of the fins 101.

A pair of header tanks 302 are joined to each flow duct end of the pipes 102 to be fluid-tight and to extend in a direction perpendicular to the longitudinal axis of each flat pipe 102.

A flow-tight joint is to be understood such that the joint allows liquid and/or gaseous fluids such as the refrigerant, to flow through said joint which is fluid-tight and/or gastight.

The high temperature charge air at approximately 270° C. flows toward or around 106 the core section of the charge-air cooler or the cooler matrix 300, wherein heat is exchanged between the charge air and the refrigerant so as to cool the charge air.

In heat exchange in this case of the invention, heat is removed from the hot charge air, reduced via the stepped fins 101 and via the flat pipes 102 joined to the stepped fins 101 via the contact surfaces 110 through 115 which are reduced to ridges 105, into the refrigerant which thus heats up to a reduced extent.

This applies in particular to so-called critical block regions and/or critical or first profiles. These are to be understood to mean those areas of the cooler block or the areas of flat pipes 102 where the hot, as yet uncooled or minimally cooled charge air first approaches in the direction of flow.

These critical profiles are those areas where coolant runs the highest risk of coming to the boil and generating steam bubbles. The advantageous inventive effect, namely, reducing or slowing down the transfer of heat is thus the most effective in these areas.

Due to the configuration of the invention of the cooling-fin flat-pipe joints or stepped fins 101, the coolant absorbs less heat or thermal energy and thus heats up to a lesser extent. A forming of steam bubbles and the resulting problems as described above is reduced.

Such a charge-air cooler of this embodiment for an internal combustion engine of motor vehicle serves to cool down the temperature of charged air supplied from a turbocharger or a compressor to the internal combustion engine of a motor vehicle which can increase the power of the internal combustion engine.

The present invention can be applied in particular in coolers or heaters generally in a cooling circuit. A configuration of the respective heat exchange matrix is not limited to the geometries described above. It can be selected as desired within the scope of the flat-pipe cooling-fin joint or the stepped cooling fin of the present invention.

Although the present invention is completely explained in conjunction with preferred embodiments and with reference to the accompanying drawing, the skilled person will comprehend numerous variations and modifications all of which lie within the scope of the present invention as specified in the accompanying claims.

The invention claimed is:

1. A device for exchanging heat, comprising:
one or more flow-though devices though which a fluid can flow and one or more fin-like shaped parts around which air can flow and which is joined to said one or more flow-though devices, said joint allowing exchange of heat to occur between the air and the fluid and comprising a plurality of ridges and recesses being alternately arranged along a longitudinal direction of the one or more fin-like shaped parts, wherein said ridges form reduced contact surfaces via which said one or more fin-like shaped parts are joined to said one or more flow-though devices and wherein there is no contact between said one or more fin-like shaped parts and said one or more flow-though devices in said recesses, and
a cooler block having a plurality of said fin-like shaped parts and a plurality of said flow-through devices wherein said plurality of said flow-through devices are arranged in several parallel planes and said plurality of said fin-like shaped parts are placed in between two adjacent flow-through devices in two planes each.

2. The device according to claim 1, wherein said one or more flow-though devices comprises a plurality of ridges along the joint by means of which a joint is established to said one or more fin-like shaped parts wherein recesses are formed between the ridges.

3. The device according to claim 1, wherein said ridges each have a length of approximately 2 mm to 8 mm, and a height of approximately 0.1 mm to 2 mm.

4. The device according to claim 1, wherein at least one of said ridges is rounded at least at one end and edges of said at least one ridge in an air flow path are rounded.

5. The device according to claim 1, wherein said recesses each have a length of approximately 5 mm to 12 mm and a height of approximately 0.1 mm to 2 mm.

6. The device according to claim 1, wherein a plurality of fin-like shaped parts are joined together to form a cooling element such that the cross-section of said cooling element is wave-like in profile.

7. The device according to claim 1, wherein said one or more fin-like shaped parts each are a cooling fin having a thickness of approximately 0.05 mm to 1 mm and a height of approximately 4 mm to 12 mm.

8. The device according to claim 1, wherein at least one of said one or more fin-like shaped parts and said one or more flow-through devices is made of a material selected from a group of materials including, aluminum, aluminum alloys, iron, iron alloys, bronze, copper, copper alloys and the like.

9. The device according to claim 1, wherein said one or more flow-though devices comprises one or more interior flow ducts substantially parallel to a longitudinal axis of said one or more flow-though devices.

10. The device according to claim 9, wherein said one or more flow ducts has a cross-section shaped substantially as a rectangle.

11. The device according to claim 1, wherein the air flows around said one or more fin-like shaped parts in the longitudinal direction of said one or more fin-like shaped parts.

12. The device according to claim 1, wherein the fluid is at least one of a liquid and a gaseous fluid, in particular a refrigerant.

13. The device according to claim 1, wherein said one or more fin-like shaped parts is joined with two flow-though devices arranged in parallel wherein said one or more fin-like shaped parts is arranged between said two flow-though devices such that the longitudinal direction of said one or more fin-like shaped parts is arranged at an angle of approximately 90° relative the principal extension of said flow-though devices arranged in parallel.

14. The device according to claim 1, wherein said one or more flow-though devices is joined to at least one of a header and a distribution device.

15. The device according to claim 1, wherein said cooler block includes at least one of a plurality of header and distributing devices each being joined to a plurality of said flow-though devices.

16. A cooler having a device according to claim 1, where the air used is charged air of a motor vehicle to be cooled down in the cooler.

* * * * *

UNITED STATES PATENT AND TRADEMARK OFFICE
CERTIFICATE OF CORRECTION

PATENT NO. : 7,516,780 B2  Page 1 of 1
APPLICATION NO. : 10/961416
DATED : April 14, 2009
INVENTOR(S) : Günther Schmalzried It is certified that error appears in the above-identified patent and that said Letters Patent is hereby corrected as shown below:

ON THE TITLE PAGE OF THE PATENT

Item (73) Assignee

Delete "Behr Industrietechnik GmbH & Co. KG, Stuttgart (DE)" and insert --Behr Industry GmbH & Co. KG, Stuttgart, Germany-- in its place.

Signed and Sealed this

Twenty-second Day of June, 2010

David J. Kappos
*Director of the United States Patent and Trademark Office*